(12) United States Patent
Claas et al.

(10) Patent No.: US 9,919,737 B2
(45) Date of Patent: Mar. 20, 2018

(54) STEERABLE CRAWLER TRACK

(71) Applicant: CLAAS INDUSTRIETECHNIK GMBH, Paderborn (DE)

(72) Inventors: Helmut Claas, Harsewinkel (DE); Heinrich Dueckinghaus, Bielefeld (DE); Robert Obermeier-Hartmann, Bueren (DE); Hendrik Schulze Zumkley, Rietberg (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 0 days.

(21) Appl. No.: 14/847,383

(22) Filed: Sep. 8, 2015

(65) Prior Publication Data

US 2016/0068185 A1 Mar. 10, 2016

(30) Foreign Application Priority Data

Sep. 10, 2014 (DE) .................... 10 2014 113 028

(51) Int. Cl.
*B62D 11/10* (2006.01)
*B62D 55/02* (2006.01)
*B62D 11/18* (2006.01)

(52) U.S. Cl.
CPC ............ *B62D 11/10* (2013.01); *B62D 11/186* (2013.01); *B62D 55/02* (2013.01)

(58) Field of Classification Search
CPC ........ B62D 11/10; B62D 11/186; B62D 55/02

USPC .......................................... 180/6.7
See application file for complete search history.

(56) References Cited

U.S. PATENT DOCUMENTS

| | | | | |
|---|---|---|---|---|
| 2,874,591 A | * | 2/1959 | Thoma | B62D 11/10 475/24 |
| 5,119,900 A | * | 6/1992 | Watanabe | B60K 23/0808 180/245 |
| 2013/0154345 A1 | * | 6/2013 | Schulz | B62D 55/14 305/129 |

FOREIGN PATENT DOCUMENTS

DE 102014104549 10/2015

* cited by examiner

*Primary Examiner* — Jacob D Knutson
*Assistant Examiner* — Felicia L. Brittman
(74) *Attorney, Agent, or Firm* — Collard & Roe, P.C.

(57) ABSTRACT

A steerable crawler track for an agricultural utility vehicle such as a tractor or a self-propelled harvesting machine has a left-side track roller unit, a right-side track roller unit, a differential having a transmission input driven by an engine, a first transmission output for driving the left track roller unit, and a second transmission output for driving the right track roller unit and a hydraulic transmission having a variable transmission ratio (i). The transmission outputs of the differential are coupled to one another via the hydraulic transmission such that the ratio of the rotational speeds ($n_l$, $n_r$) of the transmission outputs are influenced by changing the transmission ratio (i) of the hydraulic transmission.

14 Claims, 3 Drawing Sheets

STEERABLE CRAWLER TRACK

CROSS-REFERENCE TO A RELATED APPLICATION

The invention described and claimed hereinbelow also is described in German Priority Document DE 10 2014 113 028.6, filed on Sep. 10, 2014. The German Priority Document, the subject matter of which is incorporated herein by reference, provides the basis for a claim of priority of invention under 35 U.S.C. 119(a)-(d).

BACKGROUND OF THE INVENTION

The invention relates to a steerable crawler track for an agricultural utility vehicle such as, in particular, a tractor or a self-propelled harvesting machine.

Agricultural utility vehicles, in particular tractors or self-propelled harvesting machines, for example, combine harvesters or forage harvesters, are being equipped with crawler tracks to an increasing extent. The bearing forces of the vehicle can be thereby distributed over a larger ground contact area, which results in a reduced load on the ground over which the vehicle travels.

Due to the large ground contact area of a crawler track and the associated favorable traction conditions, it is advantageous to also transfer drive forces via the crawler track. For this reason, the track roller units associated with crawler tracks of agricultural utility vehicles known from the prior art are usually driven. The drive train of such a crawler track can include a differential, the transmission input of which can be driven via an engine and the two transmission outputs of which drive a track roller unit on the left side and a track roller unit on the right side.

A crawler track known from the subsequently published German patent application 10 2014 104 549.1 is also designed to be steerable. In order to implement the steering function, the transmission outputs of the differential, each of which drives one of the track roller units, are coupled to one another via a superimposed hydrostatic transmission. The ratio of the speeds of the transmission outputs—that is, the ratio of the speeds of the track roller units—can be influenced by changing the transmission ratio of the hydrostatic transmission by changing the intake volume and pump capacity of one or both of the hydrostatic units, thereby creating differential steering for the crawler track in a relatively simple way.

As compared to steerable crawler tracks, the steering function of which is implemented simply by individually braking the track roller unit located on the inside of the curve, the hydraulic superimposed steering system described in the German patent application 10 2014 104 549.1 has the advantage that the steering does not cause brake wear or the associated power losses. In addition, the hydraulic control makes it possible to achieve particularly sensitive steerability.

For heavy agricultural utility vehicles comprising such a steerable crawler track, it has been shown, however, that the hydrostatic units of the hydraulic transmission must be designed to be relatively large in order to generate sufficient torque even at low speeds. The hydrostatic units must also be capable of rotating relatively rapidly, however, so that these vehicles can be driven at relatively high speeds, for example on the road. These two requirements—high torque and high speed—largely cancel each other out, however. In any case, a hydrostatic unit that would satisfy the requirements to the practically required extent would not have acceptable structural dimensions.

SUMMARY OF THE INVENTION

Proceeding from this background, a problem addressed by the present invention is that of providing a steerable crawler track of the aforementioned type, which has a compact design and can be used both for relatively slow speeds, such as field travel, in particular, and for relatively high speeds, such as road travel, in particular.

The inventive steerable crawler track having is characterized by means for decoupling the transmission outputs from the hydraulic transmission. According to the invention, it was therefore initially seen that the differential steering created by a superimposed hydraulic transmission provides the above-mentioned advantages such as low wear, reduced power losses, and great sensitivity. In order to retain these advantages and to ensure that the crawler track having a compact design can also be used for relatively high ground speeds, it was also considered advantageous, according to the invention, to enable the transmission outputs of the differential to be decoupled from the hydraulic transmission. Means for decoupling the transmission outputs from the hydraulic transmission make it possible to release the coupling of the drives of the track roller units via the hydraulic transmission as necessary. If this is carried out, for example, when a certain ground speed and/or rotational speed has been exceeded, the hydraulic transmission can be prevented from being operated at an excessively high speed (rotational speed). Advantageously, the hydraulic transmission can therefore be designed for lower speeds.

The means provided according to the invention for decoupling the transmission outputs from the hydraulic transmission can be of different types. According to a preferred refinement of the crawler track, a first coupling is disposed between the first transmission output and a first member of the hydraulic transmission, and a second coupling is disposed between the second transmission output and a second member of the hydraulic transmission. The decoupling is therefore carried out mechanically by disengaging the couplings.

Each of the couplings is advantageously designed as a friction clutch in order to permit equalization of different speeds.

The hydraulic transmission can be of a different type. This preferably includes at least one first hydrostatic unit, which can be brought into a drive connection with the first transmission output, and a second hydrostatic unit, which can be brought into a drive connection with the second transmission output, wherein the hydrostatic units are interconnected within a hydraulic circuit. The hydraulic transmission therefore makes it possible to specify a speed ratio between the first and the second transmission output.

This speed ratio can be changed since at least one, preferably both, of the hydrostatic units preferably have a variable intake volume and pump capacity.

In order to achieve relatively high drive torques at the track roller units, the hydrostatic units can each be advantageously brought into a drive connection with the associated transmission output by means of a spur gear stage in each case. In this case, the hydrostatic units can be designed to be relatively small.

In a simple design, a spur gear stage includes a spur gear assigned to the hydrostatic unit and a spur gear, which meshes with the aforementioned spur gear and is assigned to the transmission output.

The spur gear, which is assigned to the transmission output, is preferably assigned a respective coupling, which is used to disengage or engage a drive connection between the particular spur gear and the transmission output.

In order to reliably prevent operation at an excessive speed of the hydrostatic units, an advantageous refinement of the crawler track provides a control device, which can be operated to decouple the transmission outputs from the hydraulic transmission depending on an operating parameter, in particular the ground speed of the crawler track, a speed of the transmission input, a speed of a transmission output, a speed of an hydrostatic unit, or the like.

Advantageously, it can be provided that the control device can be operated to actuate the couplings jointly by means of a suitable control.

According to an advantageous refinement of the crawler track, this crawler track can be operated in two operating modes, wherein, in a coupled operating mode, the transmission outputs of the differential are coupled to one another via the hydraulic transmission such that the crawler track can be steered by changing the transmission ratio of the hydraulic transmission and via an associated change in the ratio of the drive speeds of the track rollers units and, wherein, in a decoupled operating mode, the transmission outputs of the differential are decoupled from the hydraulic transmission such that, in a forced drive state of the crawler track, in particular during forced travel around a curve, the ratio of the speeds of the transmission outputs can be adapted to this driving state.

Preferably, the control device can be operated to select the operating mode of the crawler track depending on one or multiple operating parameters, in particular depending on the ground speed of the crawler track, a speed of the transmission input, a speed of a transmission output, a speed of an hydrostatic unit and/or the like.

Advantageously, the coupled operating mode can be selected for ground speeds and/or rotational speeds below a predefinable value and the decoupled operating mode can be selected for ground speeds and/or rotational speeds above the predefinable value.

In a particularly advantageous embodiment of the invention, the hydraulic circuit can be connected to a hydraulic pump, which is driven by a drive motor, in particular. The hydraulic circuit can be provided with additional power by means of the drive motor-driven hydraulic pump, which can be connected to the hydraulic circuit only as needed. A steering motion about a vertical axis of the crawler track is made possible by swiveling the hydrostatic units outwardly by the same extent, for example a full-scale deflection in each case, in the opposite direction. The hydrostatic units can swivel outwardly by the same extent and in the opposite direction, since the stationary differential case is unable to move when the vehicle is at a standstill. The connection of the hydraulic circuit to the hydraulic pump has the advantage that this allows a steering motion to take place even when the vehicle is at a standstill, since energy for the superimposed steering is provided not only as a function of the speed of the differential, but also via the hydraulic flow of the hydraulic pump. During slow travel, it is possible to pump an additional volume flow and, therefore, hydraulic energy, into the superimposed steering. During slow travel, in addition, the hydrostatic units can be deflected to a greater extent and thereby generate greater torque. Sufficient speeds can be generated by the additional oil flow of the hydraulic pump. As a result, the hydrostatic units can be designed with smaller dimensions, for example.

The invention also relates to an agricultural utility vehicle, in particular a tractor or a self-propelled harvesting machine having a half-track design, said vehicle having a vehicle structure, which is supported on the ground by means of a crawler track according to any one of the preceding claims and by means of an additional axle, wherein the additional axle is designed to be steerable such that the utility vehicle can be steered via the additional axle at least in the decoupled operating mode of the crawler track.

BRIEF DESCRIPTION OF THE DRAWINGS

The invention is described in greater detail in the following with reference to an attached drawing. Therein.

DETAILED DESCRIPTION OF THE INVENTION

Figure 1:
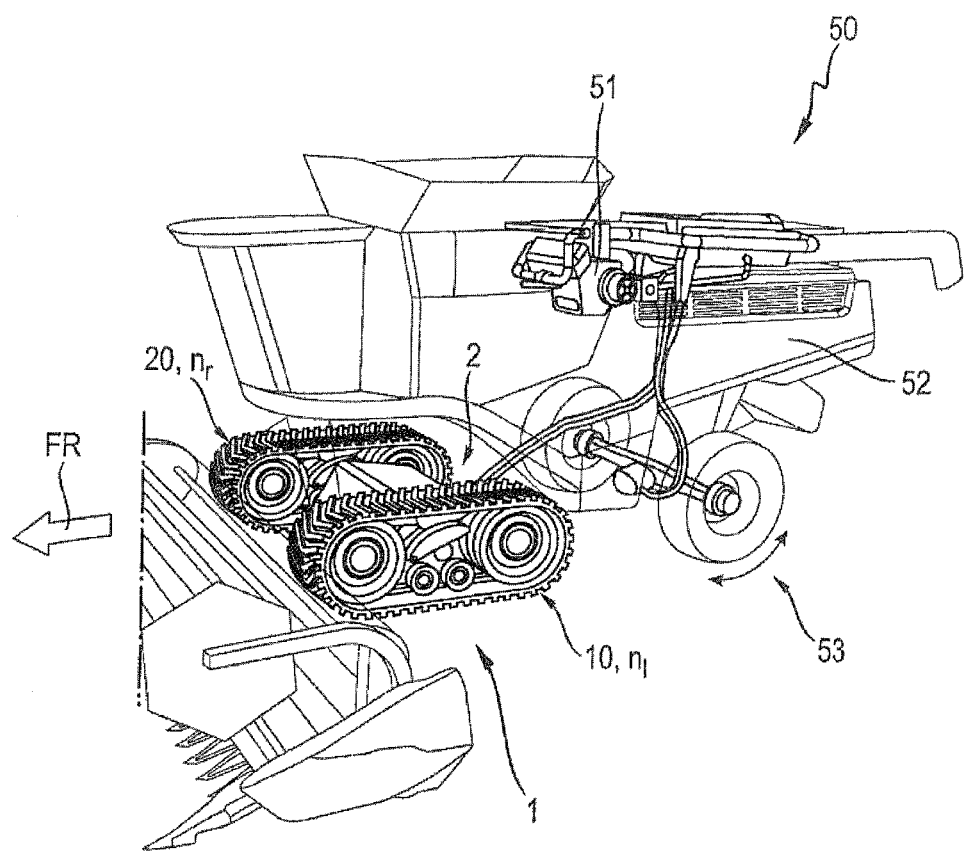
FIG. 1 shows a perspective view of an agricultural utility vehicle in the form of a combine harvester.
Figure 2:
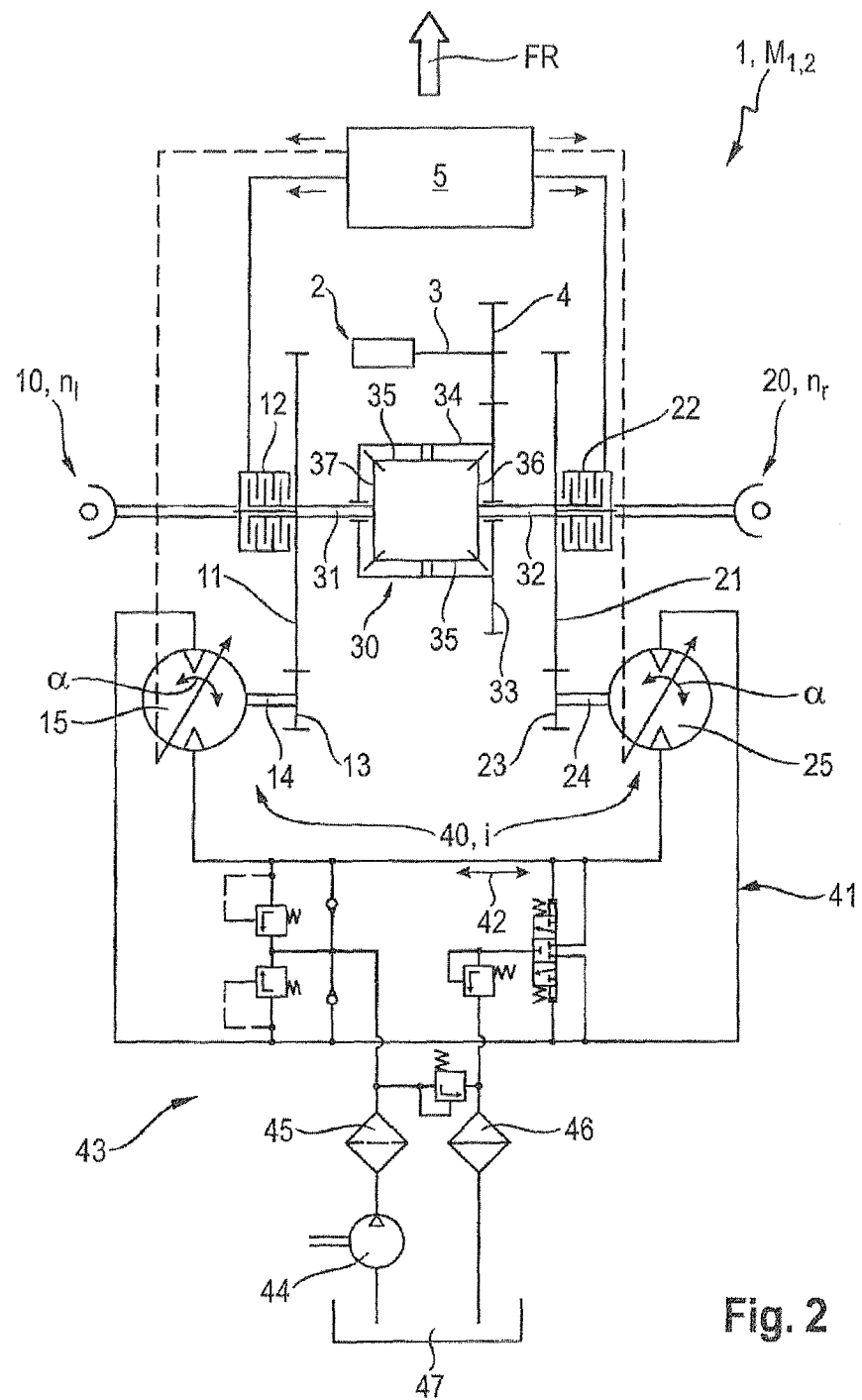
FIG. 2 shows a schematic diagram of a steerable crawler track.

FIG. 2 shows a schematic diagram of a steerable crawler track 1 according to the invention. The crawler track 1 shown can be used, advantageously, to drive an agricultural utility vehicle, such as a combine harvester 50 shown in FIG. 1, for example.

According to the illustration in FIG. 2, the crawler track 1 comprises, as essential elements, a left track roller unit 10, a right track roller unit 20, a differential 30, and a hydraulic transmission 40, which can be coupled and decoupled from this differential. A preferred direction of travel FR of the crawler track 1 is indicated by the arrow FR.

The differential 30 is a differential, which is known per se and can be driven by means of a drive engine 2. A drive shaft 3, which can be driven by the drive engine 2, has a drive connection to a differential case 34 of the differential 30 via a spur gear stage, which includes a spur gear 4 and a spur gear 33 meshed therewith. The differential case 34 rotatably accommodates a plurality of bevel gears 35. Each of the bevel gears 35 is in meshed engagement with two opposing bevel gears 36, 37. The bevel gear 37 is assigned to a first transmission output 31 for driving the left track roller unit 10 and the bevel gear 36 is assigned to a second transmission output 32 for driving the right track roller unit 20. In a manner known per se, the differential 30 distributes the drive power entering via the drive shaft 3 to the transmission outputs 31, 32.

Assigned to the first transmission output 31 is a spur gear 11, which meshes with a further spur gear 13 in order to establish a drive connection to a hydrostatic unit 15 via a shaft 14. The hydrostatic unit 15 has a variable intake volume and pump capacity (pivot angle α).

Assigned to the second transmission output 32 is a spur gear 21, which meshes with a further spur gear 23 in order to establish a drive connection to a hydrostatic unit 25 via a shaft 24. The hydrostatic unit 25 also has a variable intake volume and pump capacity (pivot angle α). The pivot angles α of the hydrostatic units 15, 25 can be controlled separately.

The two hydrostatic units 15, 25 are drivably interconnected via a closed hydraulic circuit 41 (hydraulic medium 42) in order to form a hydraulic transmission 40. The transmission outputs 31, 32 of the differential 30 are therefore coupled via the hydraulic transmission 40 in a manner known per se. A variable transmission ratio i between the transmission outputs 31, 32 results depending on the pivot angle α of the hydrostatic units 15, 25 that is selected.

The closed hydraulic circuit 41 is supplied with hydraulic medium 42 via a feed circuit 43 in a manner known per se. The feed circuit includes a hydraulic pump 44, which functions as an external pressure source, a tank 47, an oil cooler 46, and an oil filter 45.

According to the invention, the crawler track 1 shown comprises means, for example in the form of couplings, which are used to decouple the transmission outputs 31, 32 from the hydraulic transmission 40.

To this end, a first coupling 12 is disposed between the first transmission output 31 and the hydrostatic unit 15 and a second coupling 22 is disposed between the second transmission output 32 and the hydrostatic unit 25. The couplings 12, 22 are each designed as friction clutches, by means of which the respectively assigned spur gear 11, 21 can be selectively connected to the respective transmission output 31, 32 in a rotationally locked manner, or can be disconnected therefrom.

A central control device 5 has a signal connection to the two couplings 11, 21 and is operated so as to decouple the transmission outputs 31, 32 from the hydraulic transmission 40 depending on an operating parameter, in particular the ground speed of the crawler track 1, a rotational speed of the transmission input 34, a rotational speed $n_l$, $n_r$ of a transmission output 31, 32, a rotational speed of a hydrostatic unit 15, 25 and/or the like. Preferably, this decoupling is carried out jointly by means of a corresponding control in each case.

The crawler track can be operated in two operating modes $M_1$, $M_2$ with the aid of the control device 5. In a coupled operating mode $M_1$, the transmission outputs 31, 32 of the differential 30 are coupled to one another via the hydraulic transmission 40 such that the crawler track 1 can be steered by changing the ratio i of the hydraulic transmission 40 and via an associated change in the ratio of the drive speeds $n_l$, $n_r$ of the track roller units 10, 20 and, in a decoupled operating mode $M_2$, the transmission outputs 31, 32 of the differential 30 are decoupled from the hydraulic transmission 40 such that, in a forced driving state of the crawler track, in particular during forced travel around a curve, the ratio of the rotational speeds $n_1$, $n_2$ of the transmission outputs 31, 32 can be adapted to this driving state.

The control device 5 can be operated to select the operating mode $M_1$, $M_2$ of the crawler track 1 depending on one or multiple operating parameters, in particular depending on the ground speed of the crawler track 1, a rotational speed of the transmission input 34, a rotational speed $n_l$, $n_r$ of a transmission output 31, 32, a rotational speed of an hydrostatic unit 15, 25 and/or the like. The control device 5 selects the coupled operating mode $M_1$ for ground speeds and/or rotational speeds $n_l$, $n_r$ which are below a predefinable value. The control device 5 selects the decoupled operating mode $M_2$ for ground speeds and/or rotational speeds $n_l$, $n_r$ which are above a predefinable value.

FIG. 1 shows, by way of example, an agricultural utility vehicle in the form of a combine harvester 50 having a half-track design. The combine harvester 50 comprises a main drive engine 51, inter alia, for driving the drive engine 2, and comprises a vehicle structure 52, which is supported on the ground by means of a crawler track 1, which is described above with reference to FIG. 2, and by means of an additional axle 53. The additional axle 53 is designed to be steerable such that the combine harvester 50 can be steered via the additional axle 53 at least in the decoupled operating mode $M_2$ of the crawler track 1.

The combine harvester 50 comprising the crawler track 1 designed according to the invention provides the advantage that the crawler track 1 can be steered at relatively slow ground speeds by means of the coupled hydraulic transmission 40 with the aid of the hydraulic superimposed steering. Neither brake wear nor power losses associated therewith occur during steering. In addition, particularly sensitive steerability is achieved.

At relatively high ground speeds, the crawler track 1 provided on the combine harvester 50 provides the advantage that the transmission outputs 31, 32 are decoupled from the hydraulic transmission 40 and, therefore, the hydrostatic units 15, 25 do not need to be operated at an excessive rotational speed. Therefore, a compact design is possible. In this case, the steerable rear axle 53 exclusively ensures the steerability of the combine harvester 50 when the hydraulic transmission 40 is decoupled.

Figure 3:
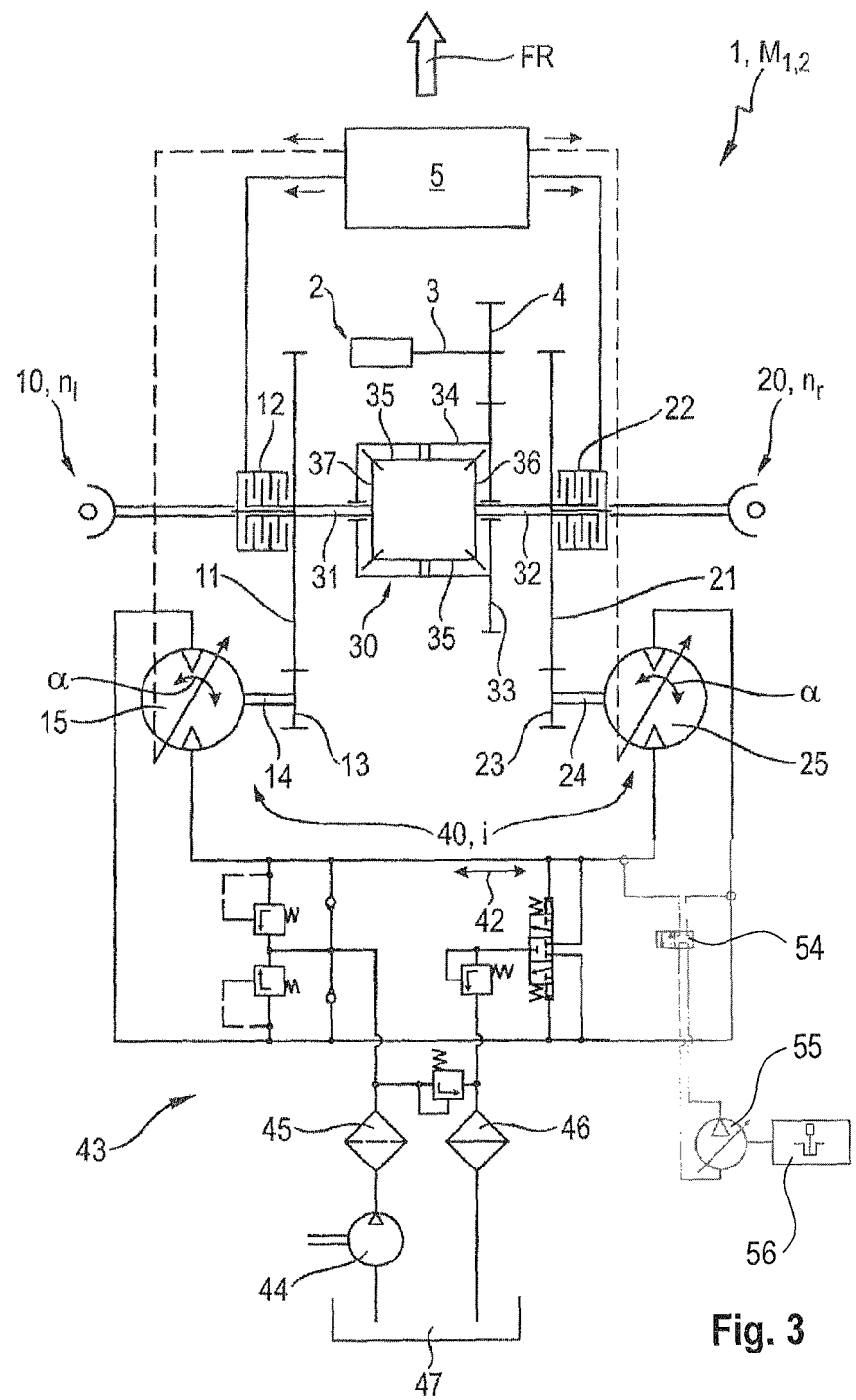
FIG. 3 shows a schematic diagram of a steerable crawler track, the hydraulic circuit of which can be connected to a hydraulic pump.

FIG. 3 shows a schematic diagram of a steerable crawler track 1, the hydraulic circuit 41 of which can be connected to a hydraulic pump 55 via a control valve 54. The hydraulic pump 55 is driven by an engine 56, for example the drive engine of an agricultural utility vehicle. When the hydraulic circuit 41 is connected to the hydraulic pump 55, power can be supplied via the hydraulic pump 55, whereby the utility vehicle can be steered when at a standstill and/or steering can be improved at a relatively slow speed.

LIST OF REFERENCE NUMBERS 1 crawler track
2 drive engine
3 drive shaft
4 spur gear
5 control device
10 left track roller unit
11 spur gear
12 friction clutch
13 spur gear
14 shaft
15 hydrostatic unit
20 right track roller unit
21 spur gear
22 friction clutch
23 spur gear
24 shaft
25 hydrostatic unit
30 differential
31 transmission output (left)
32 transmission output (right)
33 spur gear
34 differential case
35 bevel gear
36 bevel gear
37 bevel gear
40 hydraulic transmission
41 closed hydraulic circuit
42 hydraulic medium
43 feed circuit
44 hydraulic pump
45 oil filter
46 oil cooler
47 tank
50 combine harvester
51 main drive engine
52 vehicle structure
53 rear axle
54 control valve 55 hydraulic pump
56 engine
FR direction of travel
$M_1$ coupled operating mode
$M_2$ decoupled operating mode
$n_l$ rotational speed (left output)
$n_r$ rotational speed (right output)
α pivot angle

What is claimed is:

1. A steerable crawler track for an agricultural utility vehicle, comprising:
a left-side track roller unit;
a right-side track roller unit;
a differential having a transmission input, which is driven by an engine, a first transmission output coupled to the left-side track roller unit via a first coupling, for driving the left-side track roller unit and a second transmission output coupled to the right-side track roller unit via a second coupling, for driving the right-side track roller unit;
a hydraulic transmission having a variable transmission ratio (i), wherein the first and the second transmission outputs of the differential are coupled to one another via the hydraulic transmission such that a ratio of the rotational speeds ($n_1$, $n_r$) of the first and the second transmission outputs is influenced by changing the transmission ratio (i) of the hydraulic transmission; and
a control device for decoupling the transmission outputs from the hydraulic transmission;
wherein the first coupling and the second coupling are friction clutches.

2. The crawler track according to claim 1, wherein the first friction clutch is disposed between the first transmission output and a first member of the hydraulic transmission and the second friction clutch is disposed between the second transmission output and a second member of the hydraulic transmission.

3. The crawler track according to claim 2, wherein the first member of the hydraulic transmission embodies a first hydrostatic unit, which can be brought into a drive connection with the first transmission output, and the second member of the hydrostatic transmission embodies a second hydrostatic unit, which can be brought into a drive connection with the second transmission output, and wherein the first and the second hydrostatic units are interconnected within a hydraulic circuit.

4. The crawler track according to claim 3, wherein at least one of the first and the second hydrostatic units has a variable intake volume and pump capacity.

5. The crawler track according to claim 4, wherein the first and the second hydrostatic units can be brought into a drive connection with the associated first and second transmission outputs via respective spur gear stages.

6. The crawler track according to claim 5, wherein each respective spur gear stage includes a first spur gear assigned to one of the first and the second hydrostatic units and a second spur gear, wherein the second spur gear meshes with the first spur gear and wherein the respective second spur gears are assigned to the first and the second transmission outputs, respectively.

7. The crawler track according to claim 6, wherein the second spur gears, which are assigned to the first and the second transmission outputs, respectively, are assigned a respective one of the first and the second couplings, and are used to disengage or engage a drive connection between the particular second spur gear and the first and second transmission outputs.

8. The crawler track according to claim 3, wherein the hydraulic circuit can be connected to a hydraulic pump that is driven by a drive motor.

9. A steerable crawler track for an agricultural utility vehicle, comprising:
a left-side track roller unit;
a right-side track roller unit;
a differential having a transmission input, which is driven by an engine, a first transmission output, coupled to the left-side track roller unit via a first friction clutch, for driving the left-side track roller unit and a second transmission output coupled to the right-side track roller unit via a second friction clutch, for driving the right-side track roller unit;
a hydraulic transmission having a variable transmission ratio (i), wherein the first and the second transmission outputs of the differential are coupled to one another via the hydraulic transmission such that a ratio of the rotational speeds ($n_1$, $n_r$) of the first and the second transmission outputs is influenced by changing the transmission ratio (i) of the hydraulic transmission; and
a control device operable to decouple the first and the second transmission outputs, via the respective first and second friction clutches, from the hydraulic transmission depending on an operating parameter selected from the group consisting of: a ground speed of the crawler track, a rotational speed of the transmission input, a rotational speed ($n_1$, $n_r$) of one or both of the first and the second transmission outputs, and a rotational speed of one or both of the first and the second hydrostatic units.

10. The crawler track according to claim 9, wherein the control device is operated to actuate the first and the second friction clutches jointly using a control.

11. A steerable crawler track for an agricultural utility vehicle, comprising:
a left-side track roller unit;
a right-side track roller unit;
a differential having a transmission input, which is driven by an engine, a first transmission output for driving the left-side track roller unit and a second transmission output for driving the right-side track roller unit;
a hydraulic transmission having a variable transmission ratio (i), wherein the first and the second transmission outputs of the differential are coupled to one another via the hydraulic transmission such that a ratio of the rotational speeds ($n_1$, $n_r$) of the first and the second transmission outputs is influenced by changing the transmission ratio (i) of the hydraulic transmission; and
a means for decoupling the transmission outputs from the hydraulic transmission;
wherein the crawler track is configured to operate in one of first and second operating modes ($M_1$, $M_2$),
wherein the first operating mode ($M_1$) is a coupled operating mode in which the first and the second transmission outputs of the differential are coupled to one another via the hydraulic transmission such that the crawler track is steered by changing the transmission ratio (i) of the hydraulic transmission and via an associated change in the ratio of the rotational speeds of the left-side and the right-side track roller units, and
wherein the second operating mode ($M_2$) is a decoupled operating mode in which the first and the second transmission outputs of the differential are decoupled from the hydraulic transmission such that, in a forced driving state of the crawler track, the ratio of the rotational speeds ($n_l$, $n_r$) of the first and the second transmission outputs is adapted to the forced driving state.

12. The crawler track according to claim 11, further comprising a control device that is operated to select one of the first or the second operating modes ($M_1$, $M_2$) of the crawler track depending on one or multiple operating parameters selected from the group consisting of: the ground speed of the crawler track, a rotational speed of the transmission input, a rotational speed ($n_l$, $n_r$) of one of the first and the second transmission outputs, and a rotational speed of one or both of the first and the second hydrostatic units.

13. The crawler track according to claim 11, wherein the first operating mode ($M_1$) is selected for ground speeds, for rotational speeds ($n_l$, $n_r$) or both, that are below a predefinable value and the second operating mode ($M_2$) is selected for ground speeds, for rotational speeds ($n_l$, $n_r$) or both, above the predefinable value.

14. An agricultural utility vehicle having, a half-track design and a vehicle structure that is supported on the ground by a crawler track as defined by claim 11, and by an additional axle, wherein the additional axle is steerable to steer the utility vehicle at least in the second operating mode ($M_2$).

* * * * *